US011282625B2

(12) United States Patent
Ishibashi et al.

(10) Patent No.: US 11,282,625 B2
(45) Date of Patent: Mar. 22, 2022

(54) TRANSFORMER AND POWER CONVERTER

(71) Applicant: Mitsubishi Electric Corporation, Chiyoda-ku (JP)

(72) Inventors: Takaharu Ishibashi, Chiyoda-ku (JP); Takushi Jimichi, Chiyoda-ku (JP); Osamu Mori, Chiyoda-ku (JP); Takayoshi Nagai, Chiyoda-ku (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 192 days.

(21) Appl. No.: 16/638,626

(22) PCT Filed: Jul. 18, 2018

(86) PCT No.: PCT/JP2018/026879
§ 371 (c)(1),
(2) Date: Feb. 12, 2020

(87) PCT Pub. No.: WO2019/073650
PCT Pub. Date: Apr. 18, 2019

(65) Prior Publication Data
US 2020/0286668 A1   Sep. 10, 2020

(30) Foreign Application Priority Data
Oct. 12, 2017   (JP) .............................. JP2017-198356

(51) Int. Cl.
*H01F 27/25*   (2006.01)
*H01F 27/02*   (2006.01)
(Continued)

(52) U.S. Cl.
CPC ............. *H01F 27/25* (2013.01); *H01F 27/02* (2013.01); *H01F 27/28* (2013.01); *H01F 41/0213* (2013.01); *H02M 3/335* (2013.01)

(58) Field of Classification Search
CPC .......... H01F 27/25; H01F 27/02; H01F 27/28; H01F 41/0213; H01F 27/2895;
(Continued)

(56) References Cited

U.S. PATENT DOCUMENTS 352,105 A * 11/1886 Zipernowsky ........ H01F 27/292
336/83
4,893,400 A * 1/1990 Chenoweth ......... H01F 41/0226
29/606
(Continued)

FOREIGN PATENT DOCUMENTS

JP    59-117120 U   8/1984
JP    64-68912 A    3/1989
(Continued)

OTHER PUBLICATIONS

Extended European Search Report dated Nov. 6, 2020 in European Application No. 18865514.6.
(Continued)

*Primary Examiner* — Jared Fureman
*Assistant Examiner* — Michael J Warmflash
(74) *Attorney, Agent, or Firm* — Xsensus LLP

(57) ABSTRACT

A transformer includes a first iron core group, a second iron core group, and winding portions. The first iron core group includes iron core stacks. The second iron core group includes iron core stacks each disposed to face a corresponding one of the iron core stacks of the first iron core group. Each of the winding portions is wound around its corresponding iron core stack of the first iron core group and its corresponding iron core stack of the second iron core group, the corresponding one iron core stack of the second iron core group facing the corresponding one iron core stack of the first iron core group. The iron core stacks of the first iron
(Continued)

core group and the iron core stacks of the second iron core group each include annular iron cores stacked alternately.

20 Claims, 17 Drawing Sheets

(51) Int. Cl.
*H01F 27/28* (2006.01)
*H01F 41/02* (2006.01)
*H02M 3/335* (2006.01)

(58) Field of Classification Search
CPC ...... H01F 27/306; H01F 30/10; H02M 3/335; H02M 1/0048; H02M 1/0058; H02M 1/0064; H02M 1/0077; H02M 3/003; H02M 3/337; H02M 3/33584; Y02B 70/10

See application file for complete search history.

(56) References Cited

U.S. PATENT DOCUMENTS

| | | | |
|---|---|---|---|
| 7,573,000 B2 * | 8/2009 | Blankenship | H05H 1/36 219/121.54 |
| 2004/0222873 A1 | 11/2004 | Toyomura | |
| 2005/0145611 A1 | 7/2005 | Blankenship et al. | |
| 2012/0146760 A1 * | 6/2012 | Nishiura | H01F 27/245 336/84 M |
| 2016/0094133 A1 * | 3/2016 | Sasaki | H02M 3/33507 363/21.01 |

FOREIGN PATENT DOCUMENTS

| | | |
|---|---|---|
| JP | 2000-50642 A | 2/2000 |
| JP | 2004-335886 A | 11/2004 |
| JP | 2017-11964 A | 1/2017 |
| WO | WO 2011/062018 A1 | 5/2011 |
| WO | WO 2014/192399 A1 | 12/2014 |
| WO | 2016/097730 A1 | 6/2016 |

OTHER PUBLICATIONS

International Search Report dated Oct. 16, 2018 in PCT/JP2018/026879 filed Jul. 18, 2018, citing documuments AA-AF and AP-AU therein, 2 pages.

Japanese Office Action dated Apr. 3, 2019 in Japanese Patent Application No. 2019-503370, citing documents AP-AU therein, (with unedited computer-generated English translation), 12 pages.

* cited by examiner

TRANSFORMER AND POWER CONVERTER

TECHNICAL FIELD

The present invention relates to a transformer and a power converter.

BACKGROUND ART

In order to handle a large amount of power, it is studied to increase the capacity of a power converter by multiplexing a small-capacity power converter. In the multiplexed power converter, a multiple transformer is used. The power converter including the multiple transformer is described in, for example, Japanese Patent Laying-Open No. 2000-50642 (PTL 1).

CITATION LIST

Patent Literature

PTL 1: Japanese Patent Laying-Open No. 2000-50642

SUMMARY OF INVENTION

Technical Problem

The multiple transformer in the power converter described in Japanese Patent Laying-Open No. 2000-50642 includes one iron core that serves as a magnetic path shared among a plurality of windings. This leads to an increase in the size of the iron core.

As a loss in the iron core of a transformer, a hysteresis loss is known that is proportional to the frequency of an alternating-current (AC) voltage exciting the transformer. Also, an amorphous material is known as a material having a low hysteresis loss. Since the size of the iron core including the amorphous material has an upper limit due to manufacturing constraints, it is difficult to increase the size of the iron core including the amorphous material.

It is thus difficult to use an iron core including an amorphous material as one iron core that serves as the magnetic path shared among the plurality of windings, which is described in Japanese Patent Laying-Open No. 2000-50642. This leads to difficulty in restraining a hysteresis loss in the iron core of the transformer.

The present invention has been made in view of the above problem, and has an object to provide a transformer that can have an increased capacity and a restrained hysteresis loss in an iron core of the transformer, and a power converter including the transformer.

Solution to Problem

A transformer of the present invention includes a first iron core group, a second iron core group, and a plurality of winding portions. The first iron core group includes a plurality of iron core stacks adjacent to each other. The second iron core group is disposed to face the first iron core group while being spaced therefrom and includes a plurality of iron core stacks each disposed to face a corresponding one of the plurality of iron core stacks of the first iron core group. Each of the plurality of winding portions is wound across a corresponding one of the plurality of iron core stacks of the first iron core group and a corresponding one of the plurality of iron core stacks of the second iron core group, the corresponding one of the plurality of iron core stacks of the second iron core group facing the corresponding one of the plurality of iron core stacks of the first iron core group. The plurality of iron core stacks of the first iron core group and the plurality of iron core stacks of the second iron core group each include a plurality of annular iron cores stacked on each other.

Advantageous Effects of Invention

The transformer of the present invention includes the winding portions wound across the first iron core group and the second iron core group. Thus, multiplexing the transformer can lead to a higher capacity. Each of the first iron core group and the second iron core group includes the iron core stacks adjacent to each other, and each of the iron core stacks includes the annular iron cores stacked on each other. Thus, the annular iron cores can be used to form an iron core of the transformer. This enables use of a material with a low hysteresis loss which has an upper limit for the size of the iron core due to manufacturing constraints, for example, an amorphous material, for the iron cores. This can restrain a hysteresis loss in the iron core of the transformer.

DESCRIPTION OF EMBODIMENTS

Embodiments of the present invention will now be described. Specifically, embodiments of a transformer and a power converter will be described in detail with reference to the drawings. Note that the embodiments will not limit the invention disclosed herein. The embodiments can be combined as appropriate within a range free of inconsistency or contradiction. The same or corresponding parts are denoted by the same references, and description thereof will not be repeated.

Embodiment 1

Figure 1:
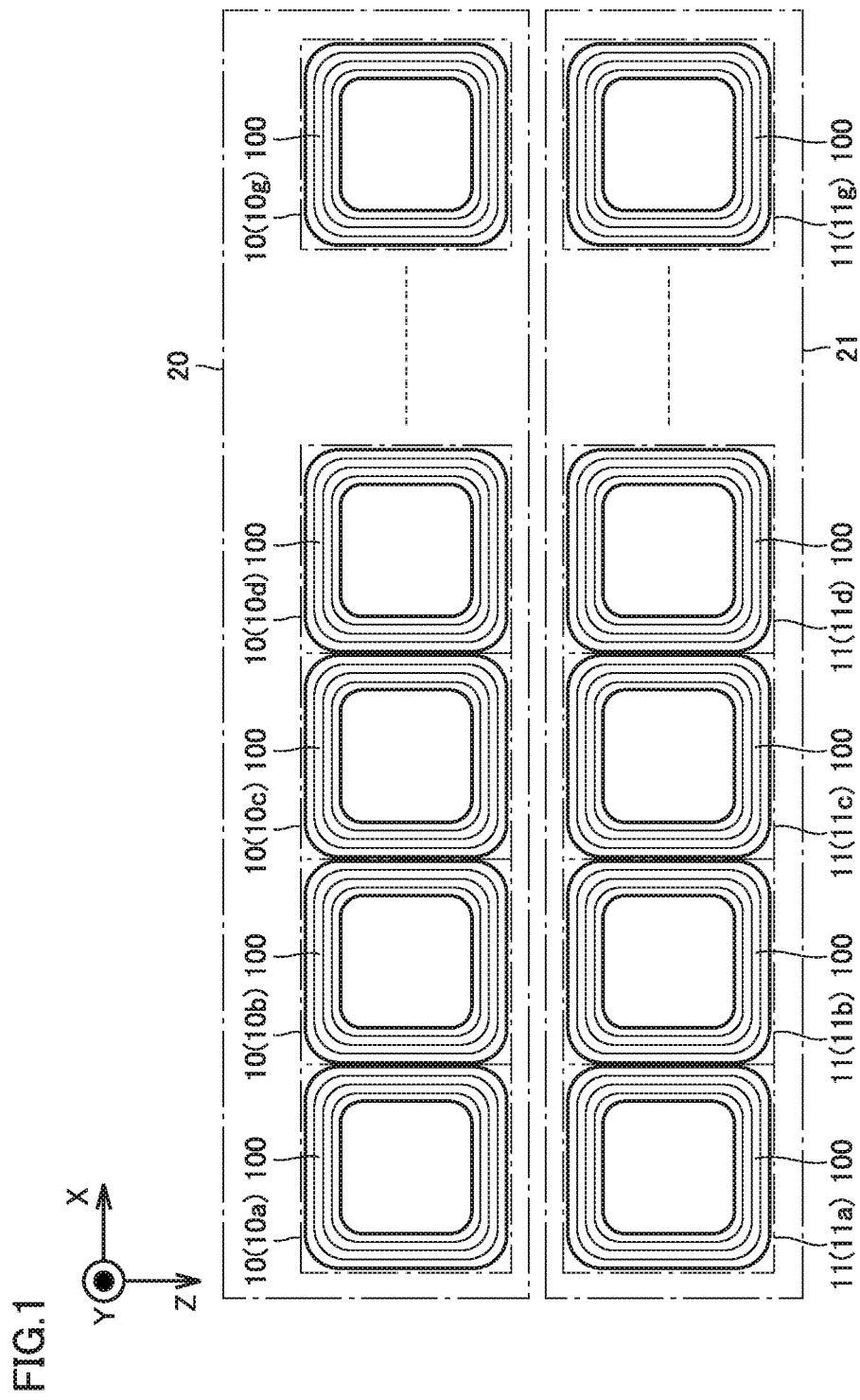
FIG. 1 is a schematic plan view of an example first iron core group and an example second iron core group of a transformer according to Embodiment 1 of the present invention.
Figure 2:
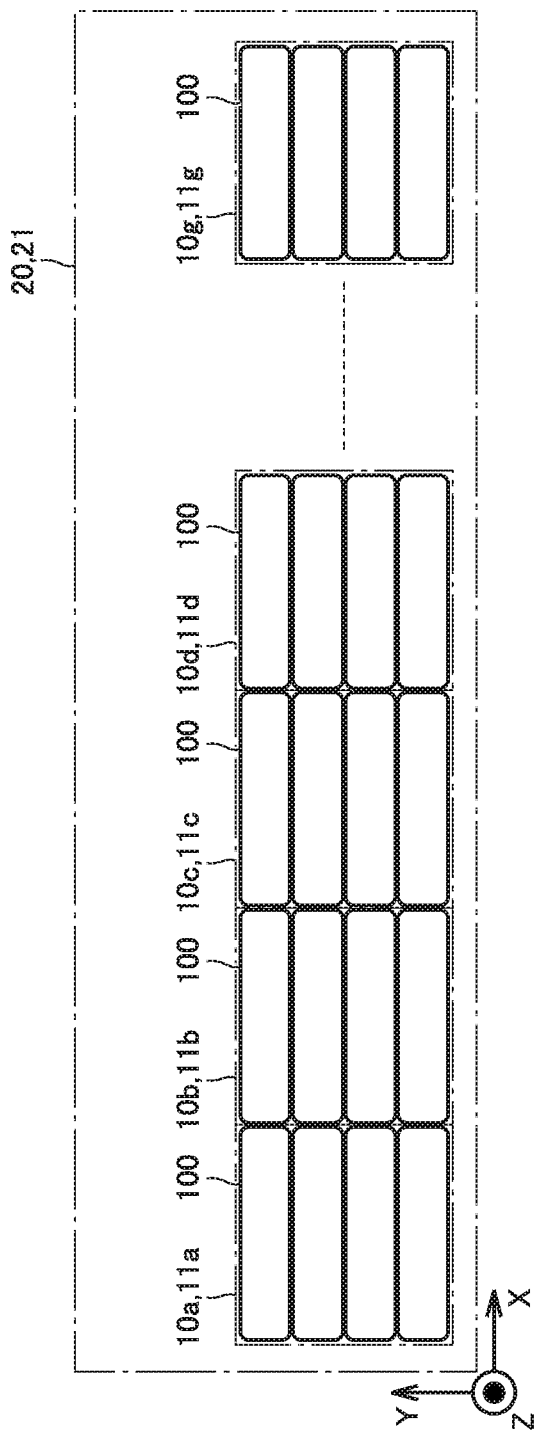
FIG. 2 is a schematic side view of example annular iron cores of the transformer according to Embodiment 1 of the present invention.
Figure 3:
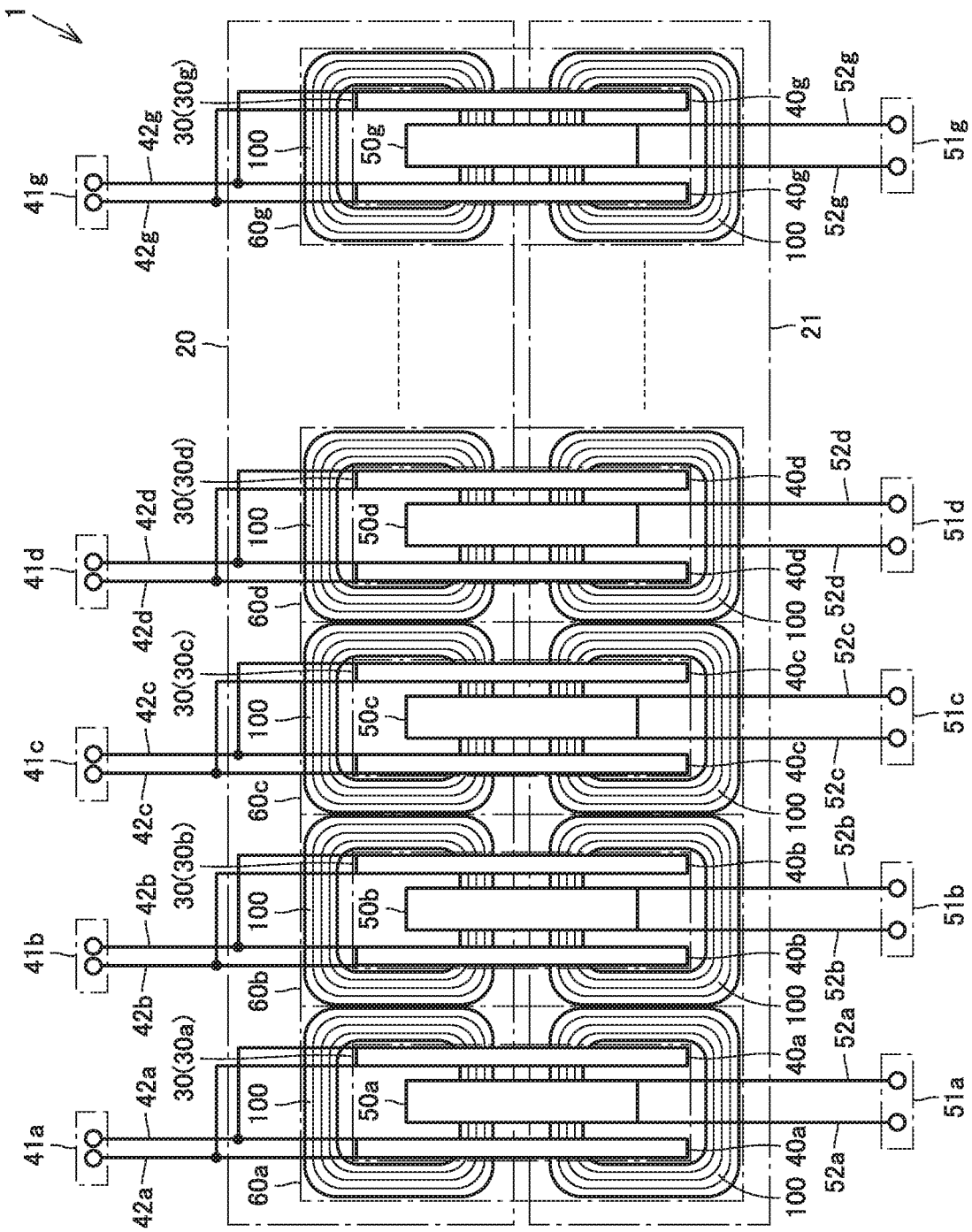
FIG. 3 is a schematic plan view of an example transformer according to Embodiment 1 of the present invention.

A configuration of a transformer 1 according to Embodiment 1 of the present invention will be described with reference to FIGS. 1 to 7. As shown in FIGS. 1 to 3, transformer 1 according to the present embodiment mainly includes a first iron core group 20, a second iron core group 21, and a plurality of winding portions 30. First iron core group 20 and second iron core group 21 are disposed to face each other while being spaced from each other. Winding portions 30 are wound across first iron core group 20 and second iron core group 21. First iron core group 20 and second iron core group 21 include a plurality of iron core stacks 10 adjacent to each other and a plurality of iron core stacks 11 adjacent to each other, respectively. Iron core stack 10, 11 includes a plurality of annular iron cores 100 stacked on each other.

First iron core group 20 includes iron core stacks 10. Iron core stacks 10 may include, for example, seven iron core stacks 10a to 10g. For the sake of convenience of description, iron core stacks 10e and 10f are not shown. Iron core stacks 10a to 10g are disposed adjacent to each other in a first direction (X direction in FIG. 1) and are formed in a ladder shape as a whole.

Second iron core group 21 includes iron core stacks 11. Iron core stacks 11 may include, for example, seven iron core stacks 11a to 11g. For the sake of convenience of description, iron core stacks 11e and 11f are not shown. Iron core stacks 11a to 11g are disposed adjacent to each other in the first direction and are formed in a ladder shape as a whole.

Adjacent iron core stacks 10 are horizontally disposed in a line such that lateral portions of the respective iron core stacks 10, which have no iron core windows, are substantially in contact with the same surface. Consequently, first iron core group 20 of ladder shape is formed. Also, adjacent iron core stacks 11 are horizontally disposed in a line such that lateral portions of the respective iron core stacks 11 are substantially in contact with the same surface. Consequently, second iron core group 21 of ladder shape is formed.

Although "horizontally (horizontal)" and "vertically" are used herein as terms indicating directions, these directions refer to the X direction and Y direction, respectively, shown in FIGS. 1 and 2.

In first iron core group 20 and second iron core group 21, surfaces having larger areas among the surfaces including no iron core windows are disposed to face each other at regular intervals without one or all of annular iron cores 100 in contact with a construction. In other words, iron core stacks 10, 11 are disposed in a lattice pattern.

In each of iron core stacks 10, 11, annular iron cores 100 are stacked in a second direction (Y direction in FIG. 2). In each of iron core stacks 10, 11, annular iron cores 100 are stacked, for example, four annular iron cores 100 may be stacked. The four annular iron cores 100 are stacked such that the centers of the windows of the respective annular iron cores 100 coincide with each other, for example, may be stacked such that the centers of the windows of the four annular iron cores 100 coincide with each other. Although iron core stack 10, 11 is formed of four annular iron cores 100 stacked vertically in the present embodiment, the number of annular iron cores 100 stacked is not limited to four. Each of annular iron cores 100 may be an annular iron core. Each of annular iron cores 100 may be formed substantially in a rectangular shape in plan view.

Each of iron core stacks 10 has a leg formed of annular iron cores 100. One of the legs of first iron core group 20 and one of the legs of second iron core group 21 which are adjacent to each other while being spaced from each other are wound around a corresponding one of winding portions 30, and are accordingly referred to as magnetic legs. On the other hand, the portions of the iron core portions of first iron core group 20 and second iron core group 21 other than the magnetic legs are referred to as yokes.

Each of iron core stacks 10 of first iron core group 20 and its corresponding one of iron core stacks 11 of second iron core group 21 are disposed to face each other while being spaced from each other. Specifically, each of iron core stacks 10 of first iron core group 20 and its corresponding one of iron core stacks 11 of second iron core group 21 are disposed to face each other while being spaced from each other in a third direction (Z direction in FIG. 1) intersecting both the first direction and the second direction.

Winding portions 30 may include, for example, seven winding portions 30a to 30g. For the sake of convenience of description, winding portions 30e and 30f are not shown. Each of winding portions 30 is wound around the leg of its corresponding one of iron core stacks 10 and the leg of its corresponding one of iron core stacks 11. Winding portions 30a to 30g are wound around the legs of iron core stacks 10a to 10f and the legs of iron core stacks 11a to 11f, respectively. Winding portions 30 are spaced from each other in the first direction (X direction in FIG. 1).

Each of winding portions 30 includes a pair of low-voltage windings 40 and a high-voltage winding 50. High-voltage winding 50 is sandwiched between the pair of low-voltage windings 40. High-voltage winding 50 is spaced from each of the pair of low-voltage windings 40. Winding portions 30a to 30g include the pairs of low-voltage windings 40a to 40g and high-voltage windings 50a to 50g, respectively. The pairs of low-voltage windings 40a to 40g and high-voltage windings 50a to 50g form winding portions 30a to 30g, respectively. Each of winding portions 30a to 30g is wound across the legs of its corresponding iron core stacks 10, 11 so as to pass through the same window.

Magnetic circuits 60a to 60g are formed of iron core stacks 10a to 10g and 11a to 11g, low-voltage windings 40a to 40g, and high-voltage windings 50a to 50g, respectively.

Description will be given below assuming that the phases of the voltages supplied to the respective low-voltage windings 40 are completely equal to each other and the phases of the voltages supplied to the respective high-voltage windings 50 are completely equal to each other.

As shown in FIG. 3, the pair of low-voltage windings 40 are connected to a low-voltage AC terminal 41 by a conductor 42. Specifically, pairs of low-voltage windings 40a to 40g are connected to low-voltage AC terminals 41a to 41g by conductors 42a to 42g, respectively. High-voltage winding 50 is connected to a high-voltage AC terminal 51 by a conductor 52. Specifically, high-voltage windings 50a to 50g are connected to high-voltage AC terminals 51a to 51g by conductors 52a to 52g, respectively. Winding portion 30 including low-voltage windings 40 and high-voltage winding 50 is wound around the legs so as to pass through the same iron core window.

The pair of low-voltage windings 40 are disposed to sandwich high-voltage winding 50 therebetween within the same iron core window. A suitable insulation distance is maintained between each of the pair of low-voltage windings 40 and iron core stack 10, 11 in accordance with the difference between the potential generated in low-voltage winding 40 and the potential present in iron core stack 10, 11. A suitable insulation distance is maintained between high-voltage winding 50 and iron core stack 10, 11 in accordance with the difference between the potential generated in high-voltage winding 50 and the potential present in iron core stack 10, 11. A suitable insulation distance is maintained between each of the pair of low-voltage windings 40 and high-voltage winding 50 in accordance with the difference between the potential generated in each of the pair of low-voltage windings 40 and the potential generated in high-voltage winding 50.

An AC voltage is applied to each low-voltage AC terminal 41, thereby exciting its corresponding annular iron cores 100. An AC voltage is applied to each high-voltage AC terminal 51, thereby exciting its corresponding annular iron cores 100.

The insulation distance between each of the pair of low-voltage windings 40 and iron core stack 10, 11 depends on the voltage applied to a corresponding one of low-voltage AC terminals 41. Also, the insulation distance between high-voltage winding 50 and iron core stack 10, 11 depends on the voltage applied to a corresponding one of high-voltage AC terminals 51. Further, the insulation distance between low-voltage winding 40 and high-voltage winding 50 depends on the potential difference between an AC voltage applied to low-voltage AC terminal 41 and an AC voltage applied to high-voltage AC terminal 51.

The required insulation distance increases with a larger potential difference. That is to say, the insulation distance required between high-voltage winding 50 and iron core stack 10, 11 is longer than the insulation distance required between low-voltage winding 40 and iron core stack 10, 11. When high-voltage winding 50 is not disposed to be sandwiched between the pair of low-voltage windings 40, thus, a longer insulation distance is required, resulting in a larger size of transformer 1. As shown in FIG. 3, however, only the insulation distance between iron core stack 10, 11 and low-voltage winding 40 is required horizontally by disposing high-voltage winding 50 between the pair of low-voltage windings 40, resulting in a smaller size of transformer 1.

Further, the horizontal distance between the pair of low-voltage windings 40 and high-voltage winding 50 can be adjusted to adjust a leakage impedance of transformer 1. Although the leakage impedance of transformer 1 can also be adjusted by increasing or reducing the number of turns of transformer 1, when the number of windings is increased, the amount of wires used may increase, resulting in an increased loss. As shown in FIG. 3, however, high-voltage winding 50 can be disposed between the pair of low-voltage windings 40 to adjust the horizontal distance between each of the pair of low-voltage windings 40 and high-voltage winding 50. This increases the degree of freedom in adjustment of the leakage impedance of transformer 1, and accordingly, the leakage impedance of transformer 1 can be made equal to the set value with a loss restrained.

Figure 4:
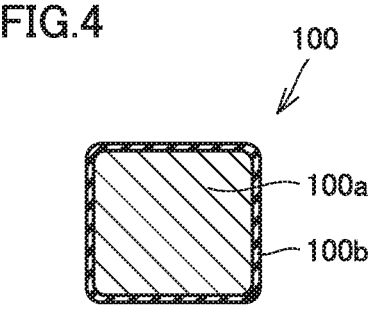
FIG. 4 is a schematic sectional view of an example annular iron core of the transformer according to Embodiment 1 of the present invention.

As shown in FIG. 4, each of annular iron cores 100 includes a core material 100a. Core material 100a includes an amorphous material. Core material 100a may be, for example, a material having a stack of a plurality of ribbon-shaped magnetic materials made of amorphous material.

Each of annular iron cores 100 includes an insulating layer 100b covering at least part of core material 100a. That is to say, each annular iron core 100 includes insulating layer 100b on its entire or partial surface. Insulating layer 100b includes at least one of an oxide and a resin. The resin is, for example, epoxy.

Figure 5:
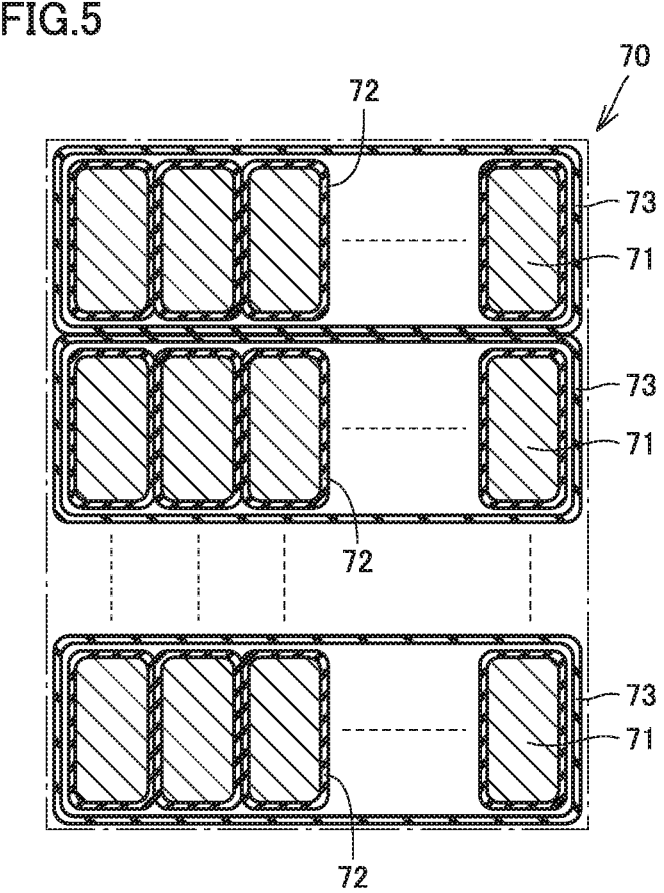
FIG. 5 is a schematic sectional view of an example conductive wire according to Embodiment 1 of the present invention.

FIG. 5 shows an example conductive wire 70 of the pair of low-voltage windings 40 and high-voltage winding 50. As shown in FIG. 5, conductive wire 70 includes a plurality of conductor strands 71. Currents flow through the pair of low-voltage windings 40 and high-voltage winding 50 while being divided to conductor strands 71. As shown in FIG. 5, each conductor strand 71 includes a strand insulation 72. Each conductor strand 71 and its corresponding strand insulation 72 are bundled by a common insulation 73, and the bundles are stacked on each other, thereby forming conductive wire 70. It is known that the eddy-current loss of a winding which is generated by interlinking of the leakage flux of transformer 1 with the winding decreases with a smaller thickness of conductor strand 71. In contrast, as the thickness of conductor strand 71 decreases, an amount of current that can be passed decreases, which hinders higher capacity. The configuration of conductive wire 70 as shown in FIG. 5, however, can allow handling of a high current by increasing the number of conductor strands also when narrow, small conductor strands 71 are used.

Figure 6:
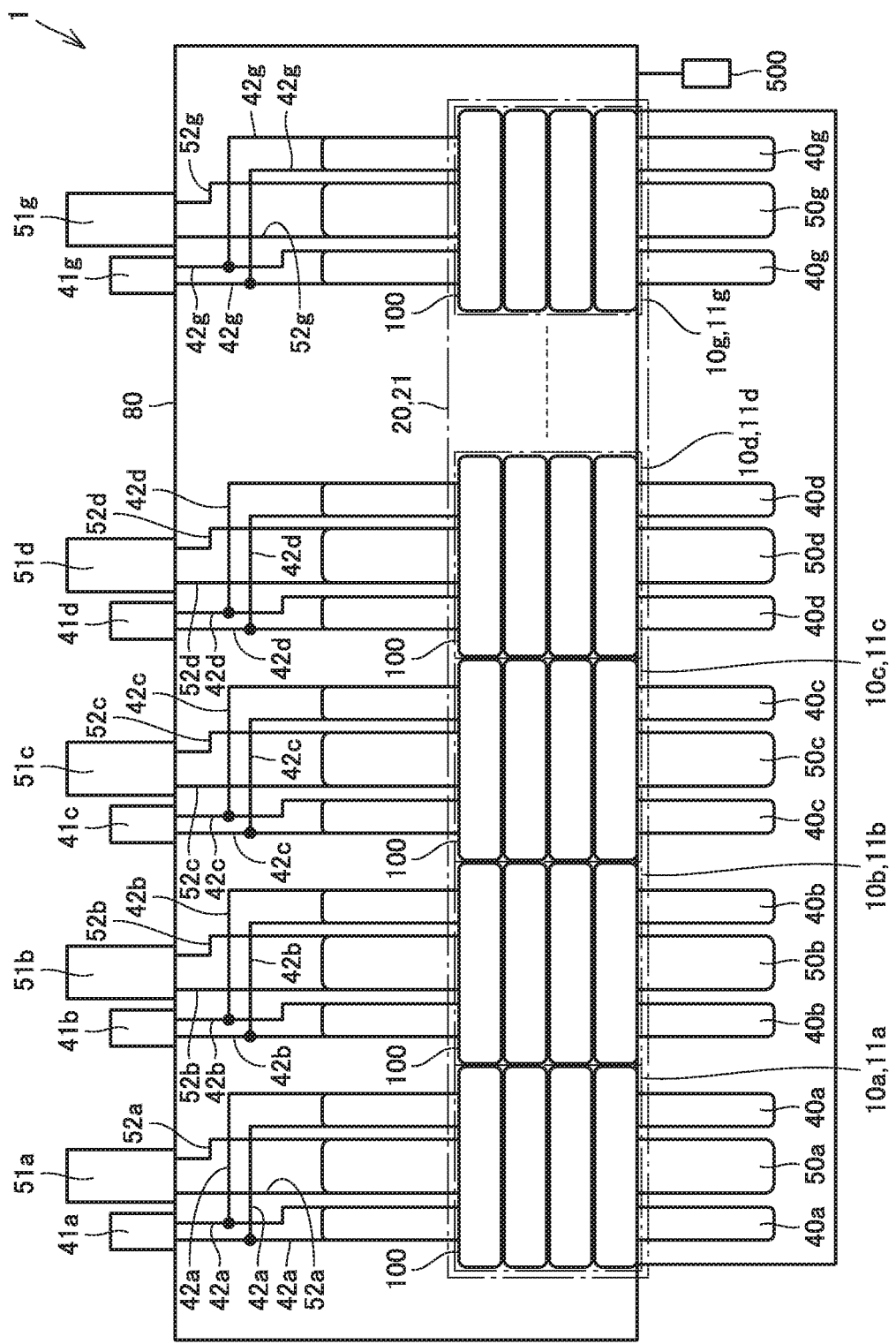
FIG. 6 is a schematic side view of an example transformer according to Embodiment 1 of the present invention.
Figure 7:
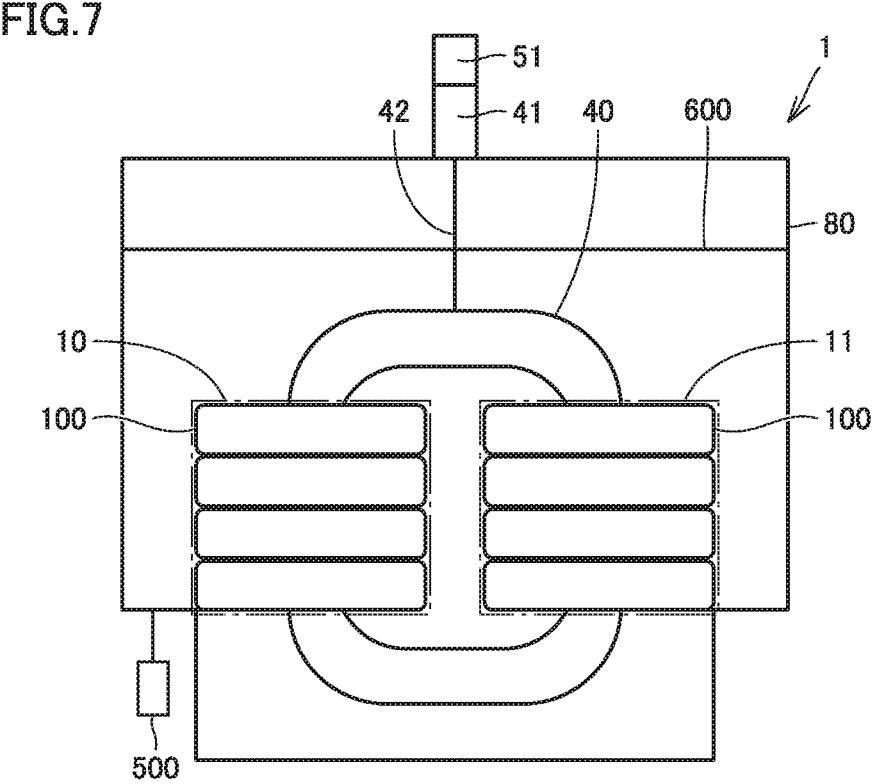
FIG. 7 is a schematic front view of an example transformer according to Embodiment 1 of the present invention.

FIGS. 6 and 7 schematically show an example structure in a tank 80 of transformer 1 according to Embodiment 1 of the present invention. For ease of illustration, FIG. 6 does not show insulating oil 600. Also, for ease of illustration, FIG. 7 shows only the fluid level of insulating oil 600. Tank 80 accommodates first iron core group 20, second iron core group 21, and winding portions 30. In other words, first iron core group 20, second iron core group 21, and winding portions 30 are accommodated in tank 80, which is a housing. Transformer 1 is accommodated in the same tank 80.

Tank 80 is filled with insulating oil 600. Within tank 80, first iron core group 20, second iron core group 21, and winding portions 30 are immersed in insulating oil 600. Insulating oil 600 has excellent insulating properties compared with air.

Insulating oil 600 circulates through tank 80 at a flow velocity suitable for insulating oil 600. Specifically, a pump 500 causes the insulating oil to circulate through the tank. Filling tank 80 with insulating oil 600 leads to a higher degree of insulation than in the air. Consequently, the insulation distance required between iron core stack 10, 11 and the pair of low-voltage windings 40 and high-voltage winding 50 can be smaller, leading to miniaturization of transformer 1.

Further, as power is supplied to transformer 1, first iron core group 20, second iron core group 21, low-voltage windings 40, and high-voltage winding 50 cause losses and generate heat. As the insulating oil circulates through tank 80 at a suitable flow velocity, however, first iron core group 20, second iron core group 21, low-voltage windings 40, and high-voltage winding 50 are cooled, leading to improved reliability of transformer 1.

Also, as shown in FIGS. 6 and 7, each low-voltage winding 40 is connected to its corresponding low-voltage AC terminal 41 located outside of tank 80 by its corresponding conductor 42, and each high-voltage winding 50 is connected to its corresponding high-voltage AC terminal 51 located on tank 80 by its corresponding conductor 52.

The functions and effects of the present invention will now be described.

Transformer 1 according to the present embodiment includes winding portions 30 wound across first iron core group 20 and second iron core group 21.

Consequently, multiplexing transformer 1 can lead to higher capacity. First iron core group 20 and second iron core group 21 respectively include iron core stacks 10, 11 adjacent to each other, and iron core stacks 10, 11 each include annular iron cores 100 stacked alternately. Thus, annular iron cores 100 can be used to form the iron cores of transformer 1. This enables use of a material with a low hysteresis loss, which has an upper limit for the size of the iron core due to manufacturing constrains, for example, an amorphous material, for the iron cores. This can restrain a hysteresis loss in the iron cores of transformer 1.

According to transformer 1 of the present embodiment, high-voltage winding 50 is sandwiched between the pair of low-voltage windings 40 and is spaced from each of the pair of low-voltage windings 40. This can reduce the distance required between high-voltage winding 50 and annular iron core 100, leading to miniaturization of transformer 1.

According to transformer 1 of Embodiment 1, core material 100a of each of annular iron cores 100 includes an amorphous material. The amorphous material, having a low hysteresis loss, can restrain the hysteresis loss of each of annular iron cores 100.

According to transformer 1 of Embodiment 1, insulating layer 100b covering at least part of core material 100a of each of annular iron cores 100 includes at least one of an oxide and a resin. As a result, core materials 100a can be insulated from each other by insulating layer 100b, leading to a reduced overcurrent loss.

According to transformer 1 of Embodiment 1, first iron core group 20, second iron core group 21, and winding portions 30 are immersed in insulating oil 600 within tank 80. This leads to a higher degree of insulation by insulating oil 600 than in the air, thus reducing the insulation distance required between iron core stack 10, 11 and the pair of low-voltage windings 40 and high-voltage winding 50. Consequently, transformer 1 can be miniaturized. Also, insulating oil 600 can cool first iron core group 20, second iron core group 21, the pair of low-voltage windings 40, and high-voltage winding 50, leading to improved reliability of transformer 1.

Embodiment 2

Embodiment 1 has been described assuming that the phases of the voltages supplied to the respective low-voltage windings 40 are completely equal to each other and the phases of the voltages supplied to the respective high-voltage windings 50 are completely equal to each other. Depending on an actual status of use, however, the phases of voltages of the respective low-voltage windings 40 and the respective high-voltage windings 50 are not necessarily equal to each other, and the maximum values of the voltages are not necessarily completely equal to each other. Further, insulating layer 100b on each surface of annular iron core 100 may partially peel off due to aged deterioration and contact between annular iron cores 100 in configuring iron core stack 10, 11. In such a situation, the insulation of transformer 1 is not sufficient, resulting in an increased eddy-current loss of annular iron core 100 or a reduced degree of insulation between adjacent annular iron cores 100. These may contribute to a reduction in the reliability of transformer 1.

Figure 8:
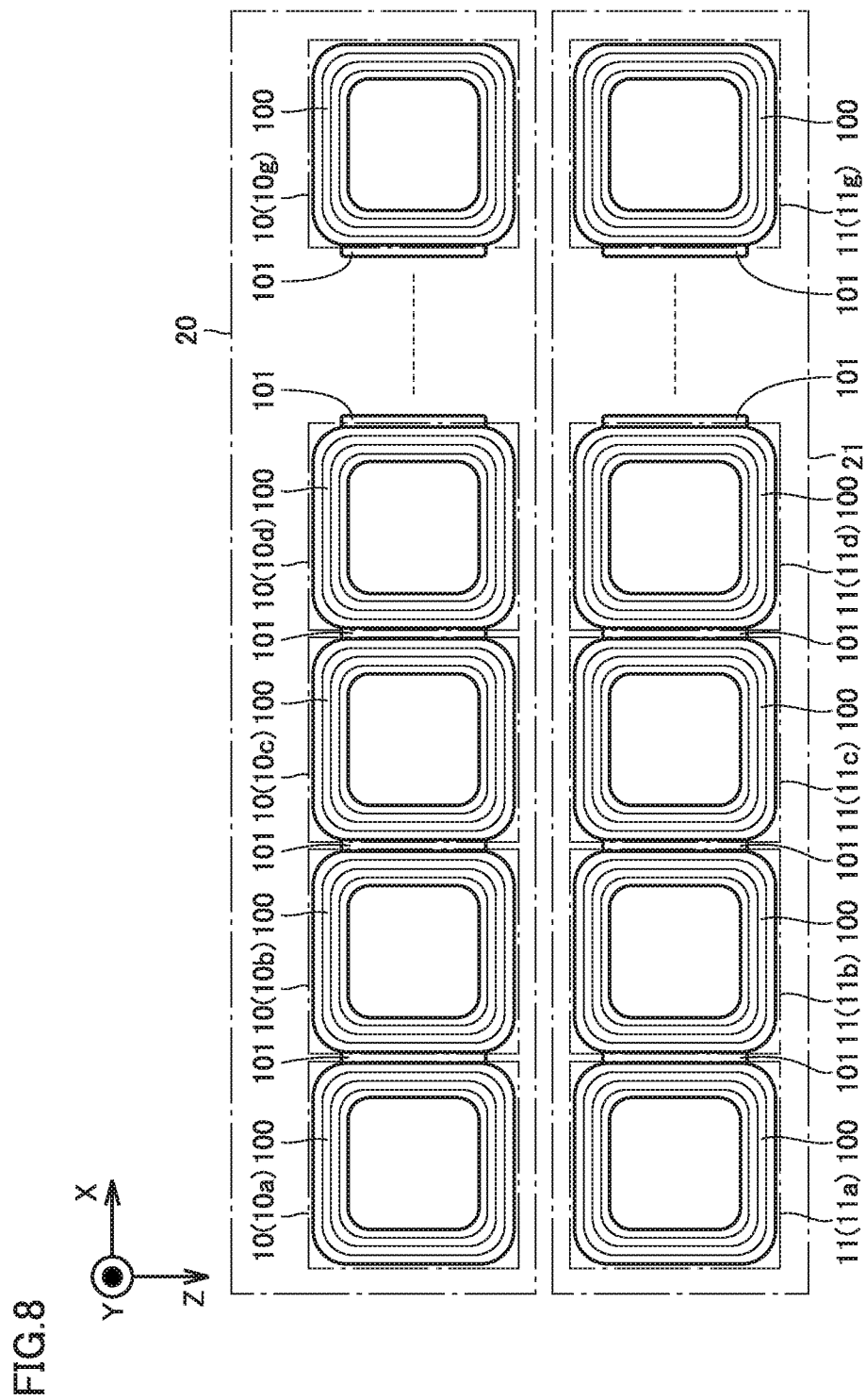
FIG. 8 is a schematic plan view of an example first iron core group and an example second iron core group of a transformer according to Embodiment 2 of the present invention.
Figure 9:
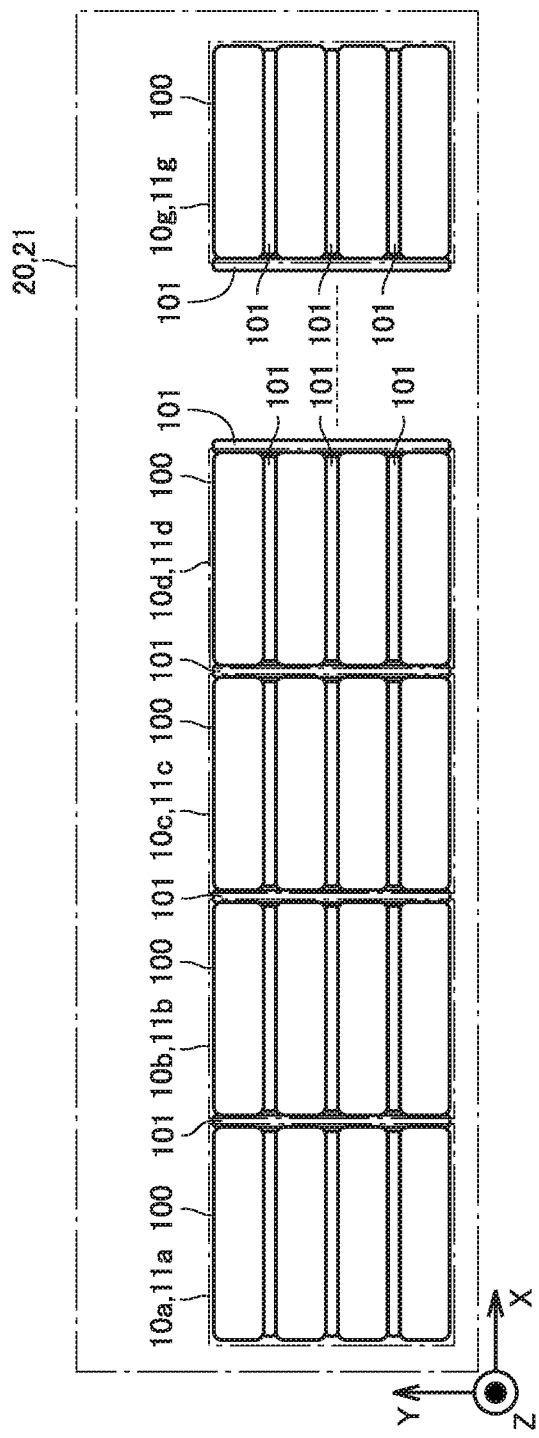
FIG. 9 is a schematic side view of example annular iron cores of the transformer according to Embodiment 2 of the present invention.

A configuration of transformer 1 according to Embodiment 2 of the present invention will be described with reference to FIGS. 8 and 9. As shown in FIGS. 8 and 9, transformer 1 of the present embodiment includes insulators 101. Insulator 101 includes a non-magnetic material.

Insulator 101 is sandwiched between iron core stacks 10 of first iron core group 20 and between iron core stacks 11 of second iron core group 21. In other words, insulator 101 is inserted between iron core stacks 10 and between iron core stacks 11.

Insulator 101 is also sandwiched between annular iron cores 100. In other words, insulator 101 is inserted between the stacked annular iron cores 100.

According to transformer 1 of the present embodiment, insulator 101 is sandwiched between iron core stacks 10 and between iron core stacks 11. This reduces an effect caused by the leakage flux from the magnetic circuit formed of iron core stacks 10, 11, low-voltage windings 40, and high-voltage winding 50 on another magnetic circuit, leading to improved reliability of transformer 1. Further, insulator 101 is sandwiched between annular iron cores 100. This can reduce an eddy-current loss generated by interlinkage of the leakage flux in the magnetic circuit with iron core stack 10, 11, leading to improved efficiency of transformer 1.

Embodiment 3

In Embodiment 1 and Embodiment 2 described above, since no part of annular iron core 100 is separated, low-voltage windings 40 and high-voltage winding 50 have to be directly wound around iron core stack 10 and iron core stack 11 with a suitable insulation distance maintained. This results in poor workability of transformer 1. A suitable degree of insulation of low-voltage windings 40 and high-voltage winding 50 from iron core stack 10, 11 thus cannot be obtained, which may contribute to a reduction in reliability.

Figure 10:
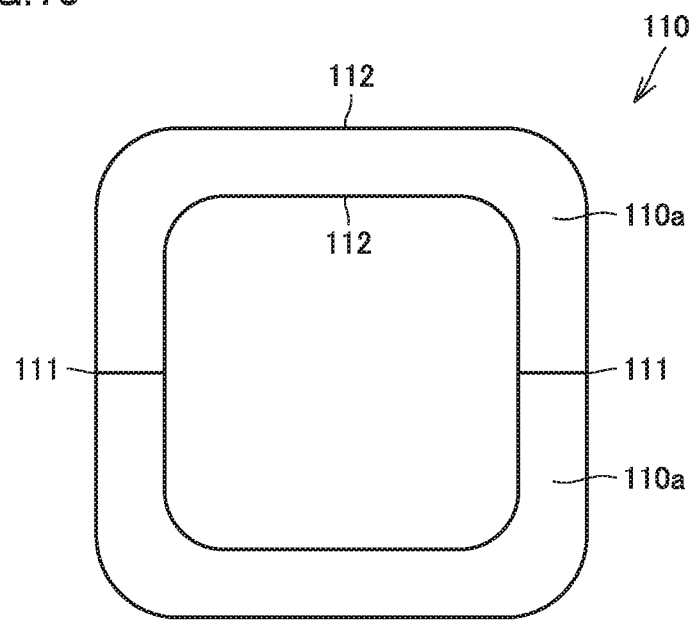
FIG. 10 is a schematic plan view of an example annular iron core of a transformer according to Embodiment 3 of the present invention.

A configuration of transformer 1 according to Embodiment 3 of the present invention will be described with reference to FIG. 10. As shown in FIG. 10, each of annular iron cores 110 includes a pair of semi-annular portions 110a. Each of the pair of semi-annular portions 110a may be formed in a square-U shape or a U-shape. Each of annular iron cores 110 is formed into an annular shape by connecting the pair of semi-annular portions 110a to each other. In other words, annular iron core 110 is formed by connecting the openings of semi-annular portions 110a to each other.

Annular iron core 110 includes a cut portion 111 at which annular iron core 110 is separable into two semi-annular portions 110a. Annular iron cores 110 are stacked such that the centers of the iron core windows thereof coincide with each other, thereby forming iron core stack 10, 11. Further, annular iron core 110 includes an insulating layer 112 on its entire or partial surface. Insulating layer 112 is made of an oxide or a resin such as epoxy.

Each annular iron core 110 is separable into a pair of semi-annular portions 110a. This eliminates the need for directly winding low-voltage windings 40 and high-voltage winding 50 around the legs. It is thus merely required to manufacture low-voltage windings 40 and high-voltage winding 50 in separate manufacturing steps and insert annular iron core 110 into each of low-voltage windings 40 and high-voltage winding 50, leading to improved workability. This can reduce a manufacturing period.

Such annular iron core 110 is referred to as a cut core.

Figure 11:
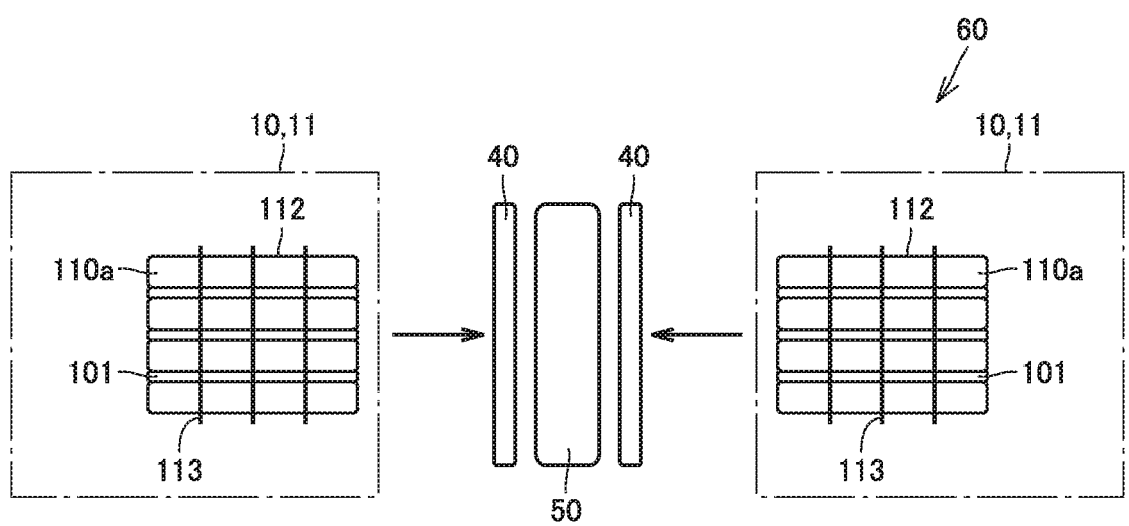
FIG. 11 is a schematic side view showing an example step of manufacturing a magnetic circuit according to Embodiment 3 of the present invention.
Figure 12:
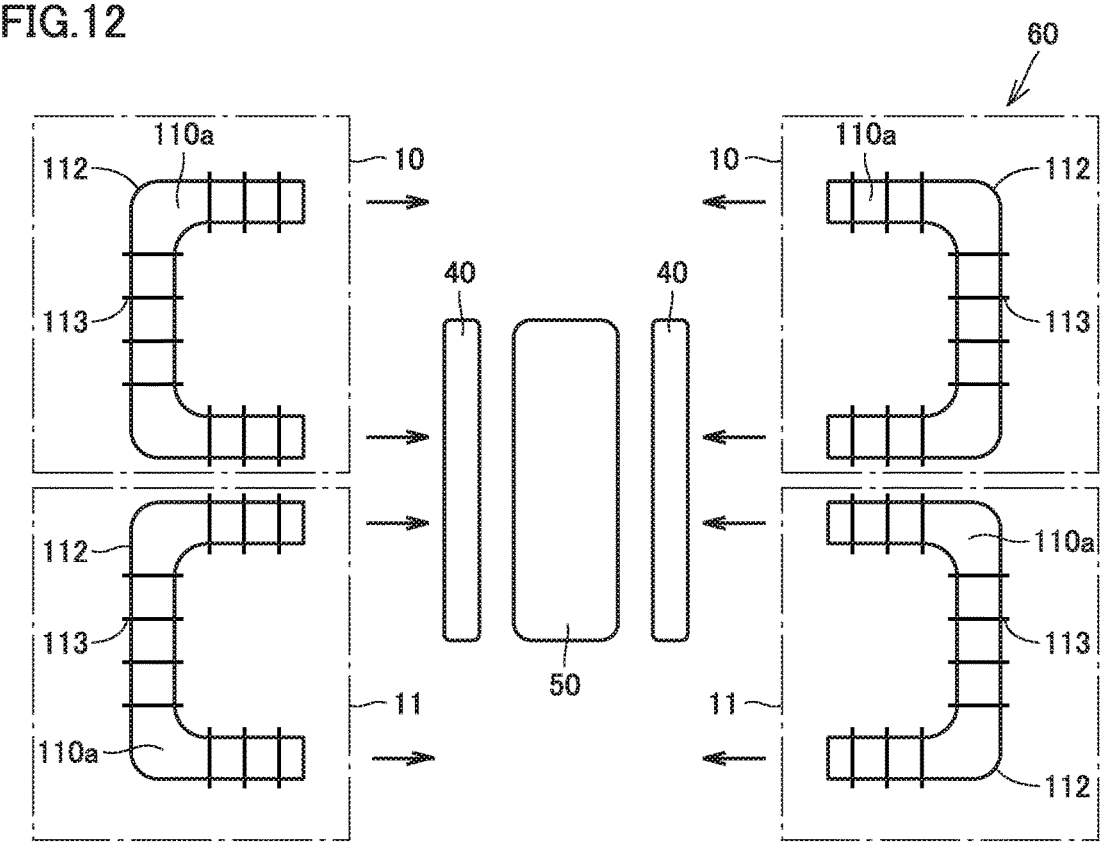
FIG. 12 is a schematic plan view showing an example step of manufacturing a magnetic circuit according to Embodiment 3 of the present invention.

FIGS. 11 and 12 show a method of manufacturing magnetic circuit 60 formed of iron core stacks 10, 11, low-voltage windings 40, and high-voltage winding 50.

Annular iron core 110 is separated into two pieces at cut portion 111. Semi-annular portions 110a of the separated annular iron core 110 are stacked with non-magnetic insulators 101 therebetween such that the sides of annular iron cores 110 coincide with each other.

Transformer 1 may include binding members (first binding members) 113 including a non-magnetic material. After being stacked, semi-annular portions 110a are fixedly fastened by string- or tape-shaped binding members 113 to be integrated with each other. Consequently, iron core stack 10, 11 is formed. Binding members 113 fixedly fasten each of the pair of semi-annular portions 110a. Binding member 113 for fixedly fastening includes, for example, non-magnetic metal, resin, plastic, or glass fiber.

Although FIGS. 11 and 12 show binding members 113 at ten spots in total in iron core stack 10, 11, the material and the number thereof are not limited as long as binding members 13 have a strength suitable for the size and the weight of annular iron core 110 and fix the pair of semi-annular portions 110a at a suitable number of spots. Although non-magnetic insulators 101 are provided to restrain an eddy-current loss or the like, non-magnetic insulators 101 may not be provided.

As shown in FIGS. 11 and 12, magnetic circuit 60 is formed by inserting each of iron core stacks 10, 11 into low-voltage windings 40 and high-voltage winding 50, manufactured in advance in separate manufacturing steps, while maintaining a suitable insulation distance.

Magnetic circuits 60 are further provided side by side with insulator 101 therebetween, and are housed in tank 80. The inserted iron core stacks 10, 11 are brought into contact with each other such that the cut surfaces of cut portions 111 coincide with each other. This prevents a reduction in the sectional area of the iron core of cut portion 111, thus restraining an increase in the loss in cut portion 111.

In the present embodiment, magnetic circuit 60 is formed by inserting iron core stacks 10, 11 into low-voltage windings 40 and high-voltage winding 50 manufactured in advance in separate manufacturing steps. Alternatively, among four iron core stacks 10, 11, low-voltage windings 40 and high-voltage winding 50 may be inserted into a set of one iron core stack 10 and one iron core 11 with a suitable insulation distance maintained, and then, a set of the other iron core stack 10 and the other iron core stack 11 may be brought into contact with each other such that the cut surfaces of cut portions 111 coincide with each other.

According to transformer 1 of the present embodiment, each of annular iron cores 110 is formed into an annular shape by connecting a pair of semi-annular portions 110a to each other. Thus, annular iron core 110 can be formed by inserting each of the pair of semi-annular portions 110a into low-voltage windings 40 and high-voltage winding 50 manufactured in separate manufacturing steps. This can improve workability, leading to a reduced manufacturing period.

According to transformer 1 of the present embodiment, binding members 113 can fix each of the pair of semi-annular portions 110a. This can improve workability, leading to a reduced manufacturing period.

According to transformer 1 of the present embodiment, binding member 113 includes non-magnetic metal, resin, plastic, and glass fiber. This can restrain an overcurrent loss caused by binding member 113.

Embodiment 4

In Embodiment 3 described above, annular iron cores 110 of iron core stack 10, 11 are fixedly fastened by binding members 113 and are brought into with each other such that the cut surfaces of cut portions 111 coincide with each other.

In the event of a short-circuit accident occurring in a system or power converter connected to low-voltage windings 40 or high-voltage winding 50 of transformer 1, or in the event of a winding short-circuit occurring in low-voltage windings 40 or high-voltage winding 50, an excessive amount of short-circuit accident current (e.g., ten times as high as a rated current) flows into low-voltage windings 40 and high-voltage winding 50. When an excessive amount of short-circuit current flows into low-voltage windings 40 or high-voltage winding 50, a short-circuit electromagnetic force is generated in low-voltage windings 40 toward annular iron cores 110, so that low-voltage windings 40 collide with annular iron cores 110. When low-voltage windings 40 collide with annular iron cores 110, iron core stacks 10, 11 matched with each other at cut portions 111 may be separated from each other. In this case, magnetic circuit 60 cannot be formed. Further, when iron core stacks 10, 11 separated as a result of the collision of low-voltage windings 40, collide with iron core stacks 10, 11 of another adjacent magnetic circuit 60, the cut surfaces of cut portions 111 may be displaced from each other due to an impact of the collision. In this case, a failure occurs, for example, the characteristics of magnetic circuit 60 becomes deteriorated. In other words, the operation using transformer 1 is not allowed after removal of the short-circuit accident, which requires replacement of the current transformer 1 with a new one after restart of power transmission.

Figure 13:
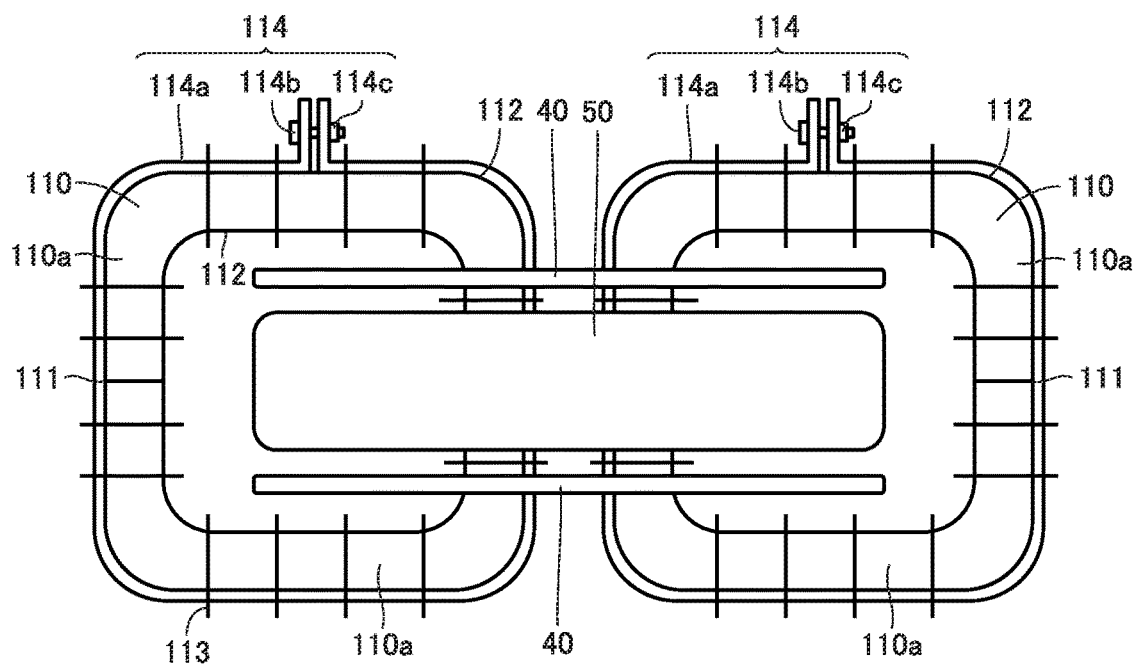
FIG. 13 is a schematic plan view of an example magnetic circuit according to Embodiment 4 of the present invention.

A configuration of transformer 1 according to Embodiment 4 of the present invention will be described with reference to FIG. 13. As shown in FIG. 13, transformer 1 includes non-magnetic fixing members 114. Fixing member 114 fixes the pair of semi-annular portions 110a by connecting the pair of semi-annular portions 110a to each other into an annular shape.

Fixing member 114 includes a fixing jig 114a, a fastening bolt 114b, and a nut 114c. Fixing jig 114a is configured to cover the outer circumference of annular iron core 110. Fixing jig 114a has attachment portions opposed to each other with a clearance therebetween on part of the outer circumference thereof. Through-holes are provided in the attachment portions, and nut 114c is attached to fastening bolt 114b with fastening bolt 114b inserted through these through-holes. Fastening bolt 114b is fastened in this state to fix annular iron core 110. Fixing member 114 keeps the state in which the cut surfaces are completely matched with each other at cut portion 111. Note that fixing jig 114a, fastening bolt 114b, and nut 114c may be non-magnetic insulators.

Iron core stack 10, 11 is formed by stacking annular iron cores 110 on each other with non-magnetic insulator 101 therebetween. The magnetic circuit is formed by inserting iron core stack 10, 11 into low-voltage windings 40 and high-voltage winding 50 with a suitable insulation distance maintained. Then, each annular iron core 110 in iron core stack 10, 11 is fixedly fastened by fixing member 114. After annular iron core 110 has been fixedly secured, binding members (first binding members)[113] fixedly fasten each of semi-annular portions 110a in iron core stack 10, 11. Consequently, a short-circuit accident current flows into low-voltage windings 40 and high-voltage winding 50 to generate a short-circuit electromagnetic force, and iron core stack 10, 11 is not separated even when low-voltage windings 40 collide with annular iron cores 110, thus allowing the magnetic circuit to keep its shape. This eliminates an effect exerted on another magnetic circuit, allowing smooth restart of the operation after removal of the accident.

In the present embodiment, each of semi-annular portions 110a in iron core stack 10, 11 is fixed by fixing member 114, and then, iron core stack 10, 11 is fixedly fastened by binding members 113. Alternatively, iron core stack 10, 11 may be fixedly fastened by binding members 113, and then, each of semi-annular portions 110a may be fixed by fixing member 114. Although each of semi-annular portions 110a is fixed by fixing member 114, iron core stack 10, 11 fixedly fastened by binding members 113 may be bundled together and fixed by fixing member 114.

According to transformer 1 of the present embodiment, in the even that a short-circuit accident occurs, fixing member 114 can restrain the spread of the accident into transformer 1. This allows smooth restart of the operation after removal of the accident.

Embodiment 5

Figure 14:
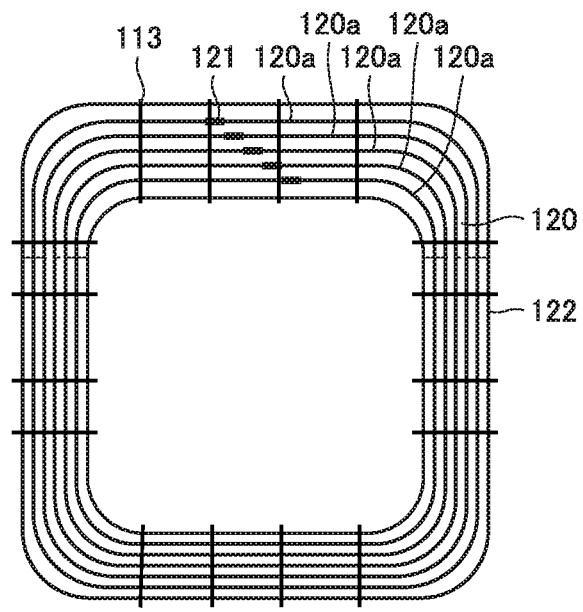
FIG. 14 is a schematic plan view of a lap joint core according to Embodiment 5 of the present invention.

A configuration of transformer 1 according to Embodiment 5 of the present invention will be described with reference to FIG. 14. As shown in FIG. 14, each of a plurality of annular iron cores 120 includes a plurality of ribbon-shaped bodies 120a. Ribbon-shaped bodies 120a include a non-magnetic material. Ribbon-shaped bodies 120a are stacked on each other. First ends and second ends of ribbon-shaped bodies 120a are bonded to each other, thereby forming a lap portion 121.

Ribbon-shaped body 120a is formed of a plurality of stacked ribbon-shaped magnetic materials. Annular iron cores 120, each of which is obtained by overlaying ribbon-shaped bodies 120a in a predetermined length and bonding ribbon-shaped bodies 120a at lap portion 121, are piled up such that the centers of the iron core windows coincide with each other, thereby forming iron core stack 10, 11. Further, annular iron core 120 includes an insulating layer 122 on a surface other than lap portion 121. Insulating layer 122 is formed of an oxide or a resin such as epoxy. Annular iron core 120 can be open at lap portion 121 and can be deformed into a U-shape. It is thus not required to directly wind low-voltage windings 40 and high-voltage winding 50 around the magnetic legs in annular iron core 120. For this reason, it suffices that low-voltage windings 40 and high-voltage winding 50 are manufactured in separate manufacturing steps in advance, annular iron core 120 which is open at lap portion 121 and is deformed into a U-shape is inserted into low-voltage windings 40 and high-voltage winding 50, and annular iron core 120 is closed again at lap portion 121 into an annular shape, leading to improved workability. This can reduce a manufacturing period. Such annular iron core 120 is referred to as a lap joint core.

Figure 15:
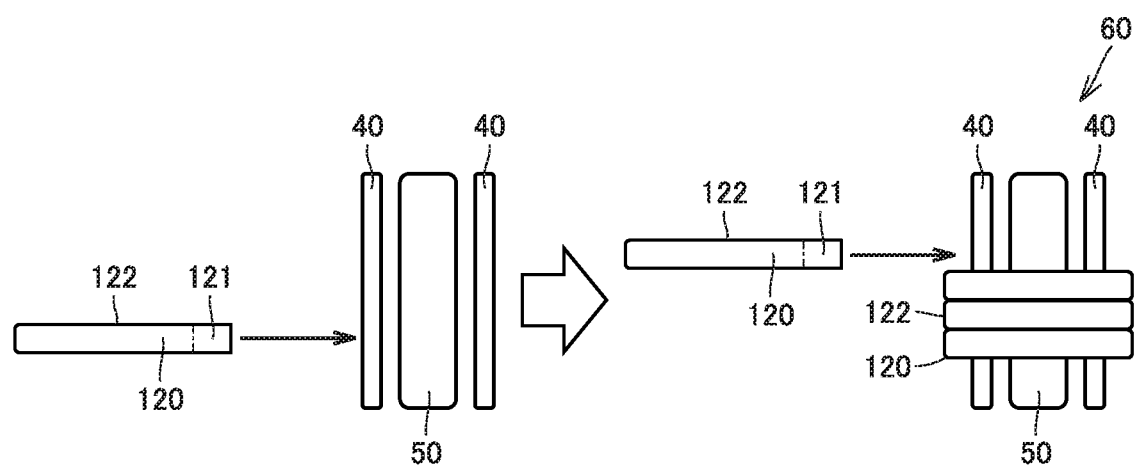
FIG. 15 is a schematic side view showing an example step of manufacturing a magnetic circuit according to Embodiment 5 of the present invention.
Figure 16:
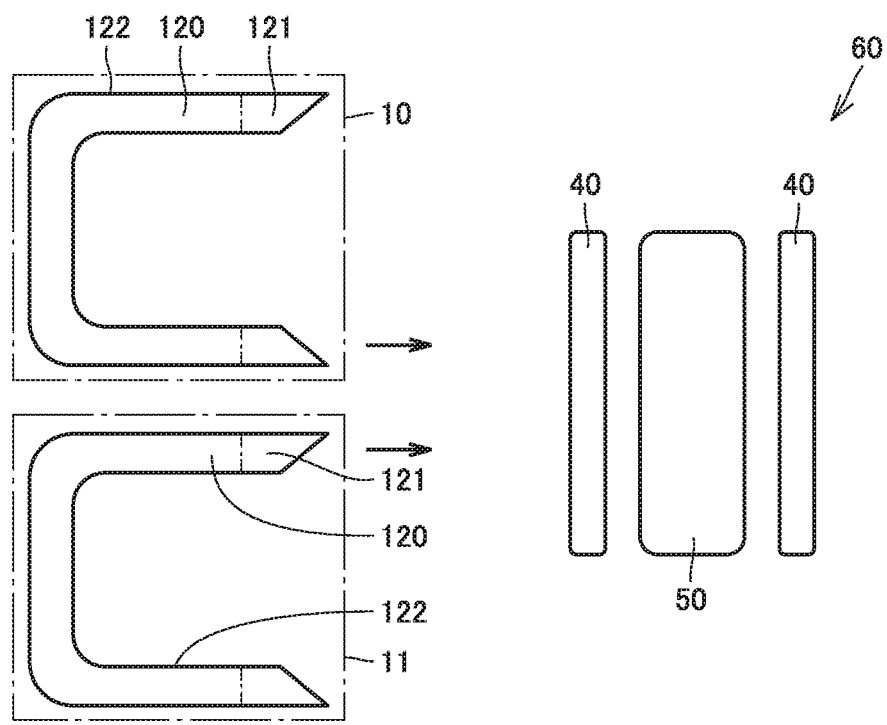
FIG. 16 is a schematic plan view showing an example step of manufacturing a magnetic circuit according to Embodiment 5 of the present invention.

FIGS. 15 and 16 show a method of manufacturing magnetic circuit 60 formed of iron core stack 10, iron core stack 11, low-voltage windings 40, and high-voltage winding 50. As shown in FIGS. 15 and 16, annular iron core 120 can be deformed into a U-shape at lap portion 121. Two annular iron cores 120 deformed into a U-shape are each inserted into low-voltage windings 40 and high-voltage winding 50 manufactured in separate manufacturing steps in advance with a suitable insulation distance maintained, and are closed again at lap portion 121 into an annular shape. Further from this state, annular iron core 120 deformed into a U-shape is additionally mounted to be piled up with a suitable insulation distance maintained such that the center of its iron fore window coincides with those of annular iron cores 120 inserted into low-voltage windings 40 and high-voltage winding 50. This operation is repeated several times to form iron core stack 10 and iron core stack 11, thereby manufacturing magnetic circuit 60 formed of iron core stack 10, iron core stack 11, low-voltage windings 40, and high-voltage winding 50. Magnetic circuits 60 are provided side by side with non-magnetic insulator 101 therebetween, and are housed in tank 80.

After annular iron cores 120 are piled up to form iron core stack 10, 11, annular iron cores 120 may be fixedly fastened by string- or tape-shaped binding members (second binding members) 113.

Further, lap portion 121 of each annular iron core 120 in iron core stack 10, 11 may be fastened by string- or tape-shaped binding members 113. Thus, the shape can be maintained even when such a force that deforms annular iron core 120 into a U-shape is exerted on lap portion 121 in the event of, for example, a short-circuit accident, thus allowing transformer 1 to be used continuously also after removal of the accident.

This leads to improved reliability.

Figure 17:
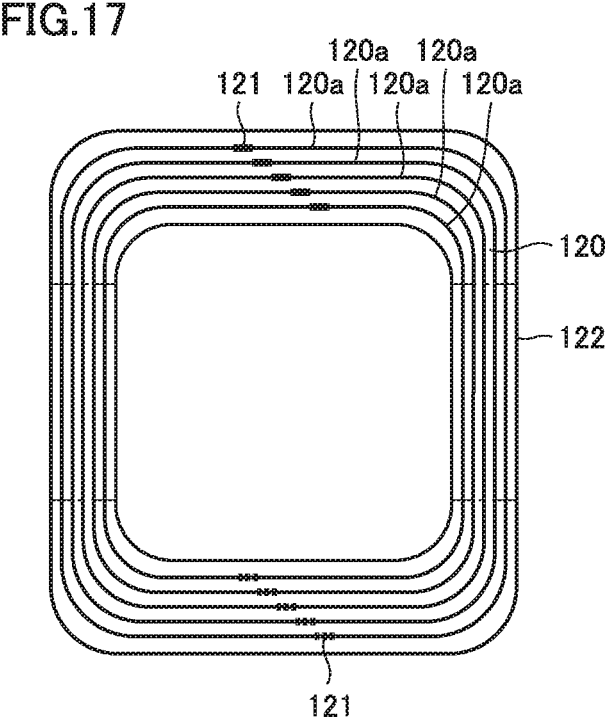
FIG. 17 is a schematic plan view of a plurality of stacked annular iron cores according to Embodiment 5 of the present invention.

Referring to FIG. 17, annular iron cores 120 may be piled up such that the positions of lap portions 121 are displaced by 180 degrees in iron core stack 10, 11. Annular iron cores 120 are piled up such that lap portions 121 are displaced alternately by 180 degrees. This can distribute the positions of lap portions 121, thus leading to reductions in noise and vibrations in the entire transformer 1. Also, the iron core cooling performance can be improved, and further, a local temperature rise can be mitigated.

According to transformer 1 of the present embodiment, annular iron cores 120 can be bonded at lap portions 121, leading to improved workability. This can reduce a manufacturing period.

According to transformer 1 of the present embodiment, the shape can be maintained by binding members 113 even when such a force that deforms annular iron core 120 into a U-shape is exerted on lap portion 121 in the event of for example, a short-circuit accident. This allows transformer 1 to be used continuously also after removal of the accident, leading to improved reliability.

According to transformer 1 of the present embodiment, binding member 113 includes non-magnetic metal, resin, plastic, and glass fiber. Consequently, an overcurrent loss caused by binding members 113 can be restrained.

According to transformer 1 of the present embodiment, annular iron cores 120 are piled up such that lap portions 121 are displaced alternately by 180 degrees. This can distribute the positions of lap portions 121, leading to reductions in noise and vibrations in the entire transformer 1. Also, the iron core cooling performance can be improved, and further, a local temperature rise can be mitigated.

Embodiment 6

Figure 18:
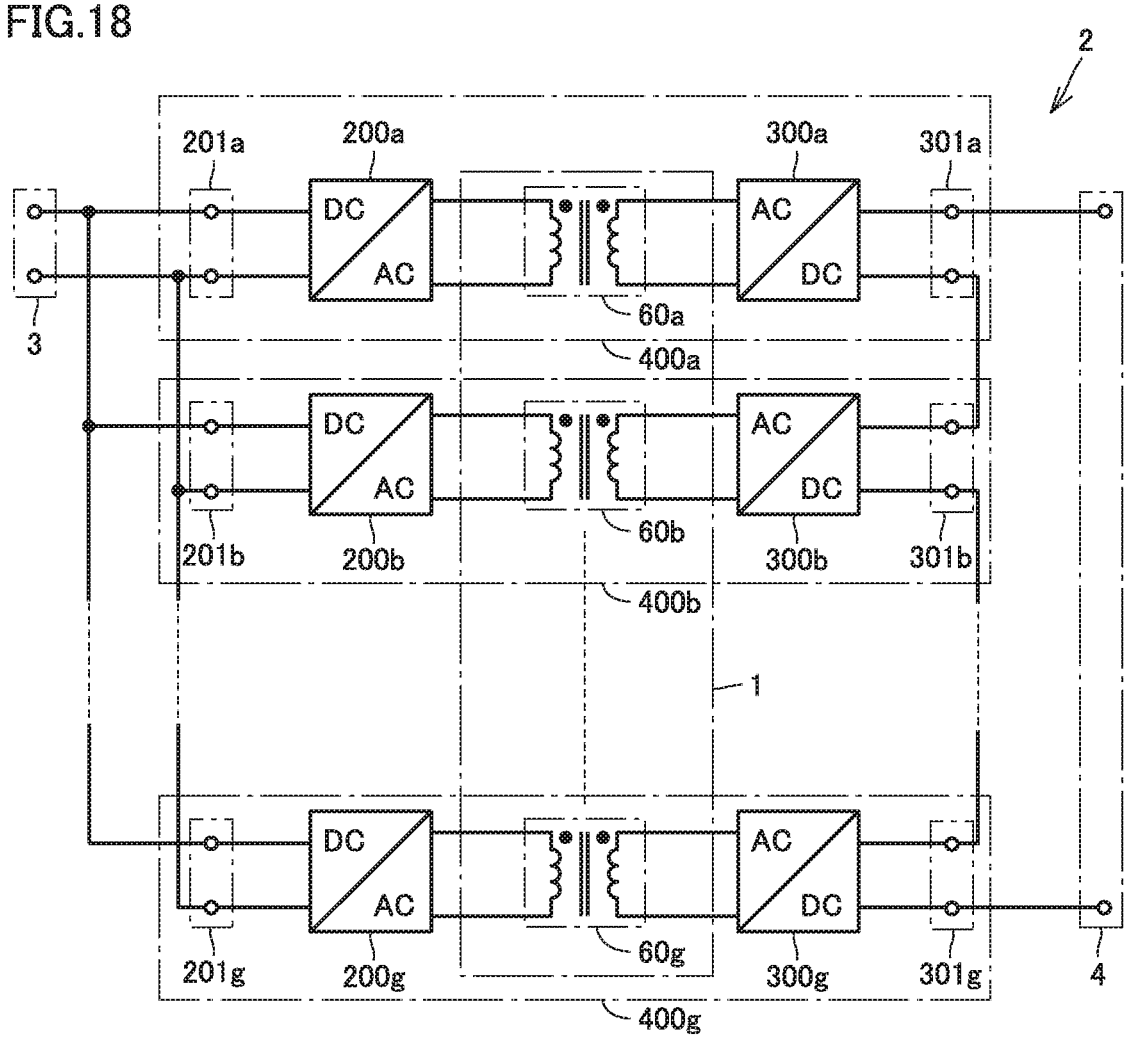
FIG. 18 schematically shows an example configuration of a power converter according to Embodiment 6 of the present invention.

FIG. 18 shows a power converter 2 according to Embodiment 5. Power converter 2 includes a first terminal 3, which outputs direct-current (DC) power, a second terminal 4, which outputs DC power, a plurality of DC/AC converters 200, and a plurality of AC/DC converters 300. DC/AC converters 200 include, for example, seven DC/AC converters 200a to 200g. AC/DC converters 300 include, for example, seven AC/DC converters 300a to 300g. Each of DC/AC converters 200 includes a DC terminal 201. DC terminals 201 include, for example, seven DC terminals 201a to 201g. DC terminals 201 are connected to each other in parallel and are connected in parallel with first terminal 3. Further, each AC terminal is connected to low-voltage AC terminal 41 (see FIG. 3).

Each of AC/DC converters 300 includes a DC terminal 301. DC terminals 301 include, for example, seven DC terminals 301a to 301g. DC terminals 301 are connected to each other in series, and the series-connected DC terminals 301 are connected in parallel with second terminal 4. Further, each AC terminal is connected to high-voltage AC terminal 51 (see FIG. 3). In other words, power converter 2 is a DC/DC converter that includes transformer 1 and converts DC power into DC power, and includes a plurality of DC/DC converter cells 400 each composed of DC/AC converter 200, magnetic circuit 60, and AC/DC converter 300. Note that transformer 1 in Embodiment 5 is transformer 1 described in any one of Embodiment 1 to Embodiment 4 and includes magnetic circuits 60a to 60g. Although FIG. 18 shows the case in which seven DC/DC converter cells 400 are provided for ease of illustration, the present invention is not limited thereto.

DC/DC converter cell 400 is a circuit that converts a DC voltage applied to low-voltage DC terminal 201 into a DC voltage to be applied to high-voltage DC terminal 301 via DC/AC converter 200, magnetic circuit 60, and AC/DC converter 300, and can freely control bidirectional power conversion. The turn ratio of magnetic circuit 60, that is, a ratio n between low-voltage winding 40 and high-voltage winding 50 is desirably matched to the ratio between a DC voltage on a primary side and a DC voltage on a secondary side. DC/DC converter cell 400 boosts the DC voltage of low-voltage DC terminal 201 and outputs the DC voltage to high-voltage DC terminal 301, as a normal operation. When, for example, Vin is supplied to first terminal 3 in power converter 2, thus, a DC power converted into a voltage n×7 times as high as Vin is supplied to second terminal 4.

A high-voltage, high-capacity power converter can be obtained by configuring power converter 2 as described above.

Figure 19:
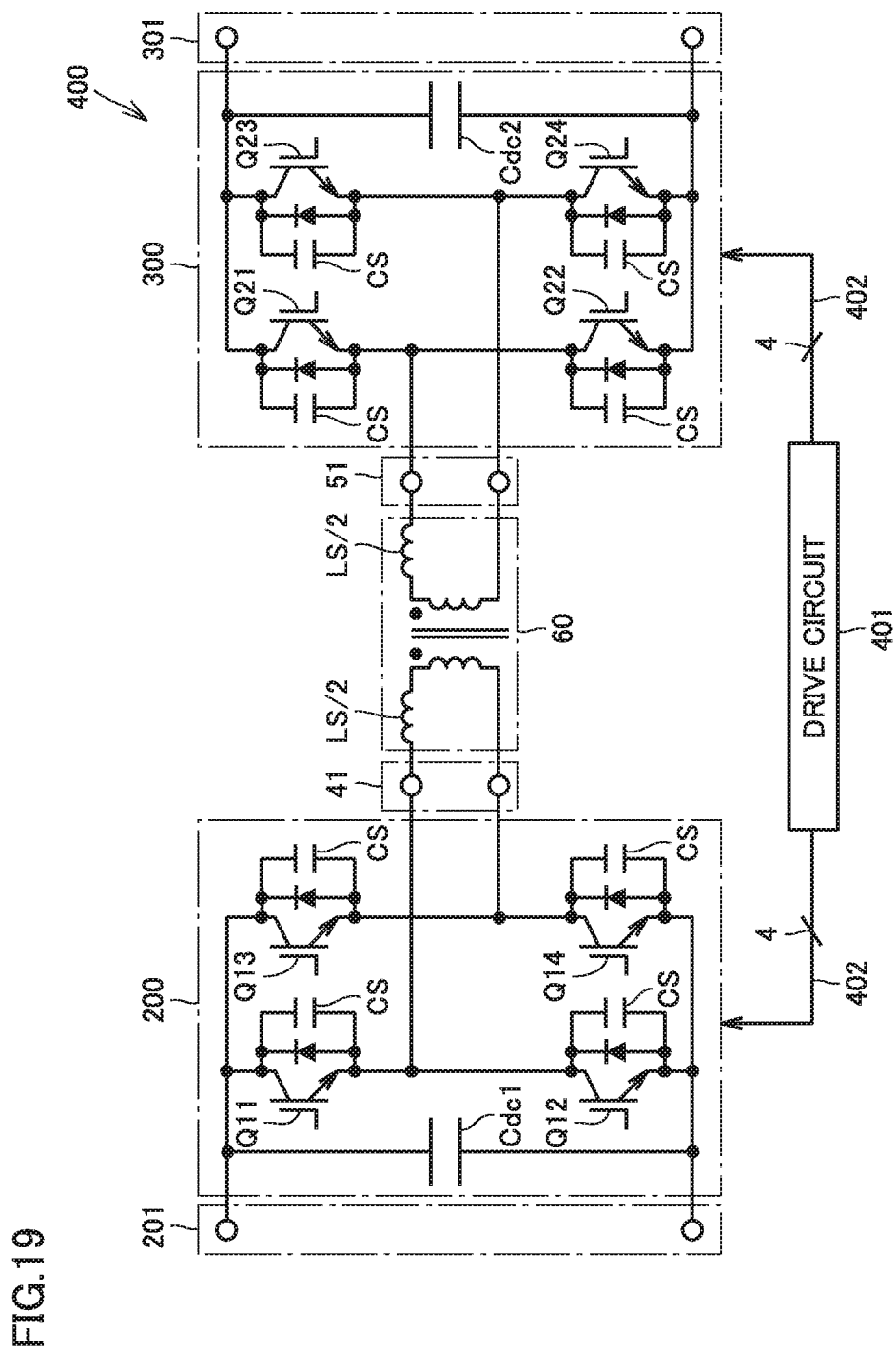
FIG. 19 schematically shows an example configuration of a DC/DC converter according to Embodiment 6 of the present invention.

FIG. 19 is a circuit diagram of DC/DC converter cell 400. As shown in FIG. 19, DC/DC converter cell 400 includes DC/AC converter 200, AC/DC converter 300, and magnetic circuit 60. DC/AC converter 200 includes a DC capacitor Cdc1 connected in parallel with DC terminal 201, and a full-bridge circuit (first full-bridge circuit) composed of two switching legs formed through series connection of semiconductor switching elements Q11 to Q14, two of which are on the positive side and the others are on the negative side. The AC/DC converter includes a DC capacitor Cdc2 connected in parallel with DC terminal 301, and a full-bridge circuit (second full-bridge circuit) composed of two switching legs formed through series connection of semiconductor switching elements Q21 to Q24, two of which are on the positive side and the others are the negative side. An intermediate connection point of each switching leg of DC/AC converter 200 is connected with low-voltage AC terminal 41 of transformer 1, and an intermediate connection point of each switching leg of AC/DC converter 300 is connected with high-voltage AC terminal 51 of transformer 1, so that magnetic circuit 60 is connected.

Used as semiconductor switching elements Q11 to Q24 are, for example, semiconductor switching elements having a self-arc-extinguishing function, for example, insulated gate bipolar transistors (IGBTs) to which diodes are connected in antiparallel. Semiconductor switching elements Q11 to Q24 may be configured to be switched at a frequency not less than 100 Hz. Semiconductor switching elements Q11 to Q24 may be some of semiconductor switching elements combined in parallel in accordance with a current capacity. Drive circuit 401 generates a gate signal 402 to semiconductor switching elements Q11 to Q24 of DC/DC converter cell 400 to control switching of semiconductor switching elements Q11 to Q24.

In this case, a snubber capacitor CS is connected in parallel with each of semiconductor switching elements Q11 to Q24. The action between snubber capacitor CS and an inductance LS of an AC output line enables zero-voltage switching, which is soft switching of each of semiconductor switching elements Q11 to Q24.

In this case, soft switching of semiconductor switching elements Q11 to Q24 can reduce a switching loss and increase an operation frequency, leading to miniaturization of magnetic circuit 60. Thus, transformer 1 can be miniaturized. Note that soft switching is a technique of reducing a voltage or current applied to a semiconductor switching element during a switching transition period with the use of the resonance phenomenon, thereby reducing a switching loss or electromagnetic noise.

Inductance LS may be a leakage inductance of magnetic circuit 60.

For example, electrolytic capacitors or film capacitors are used as DC capacitors Cdc1 and Cdc2. Although a high-frequency current flows through DC capacitors Cdc1 and Cdc2, when the film capacitors are used, degradation caused by a high-frequency current can be restrained, leading to a longer life.

Although a loss in the transformer would increase when the operation frequency of each of semiconductor switching elements Q11 to Q24 is increased for a higher frequency (e.g., not less than 61 Hz) in order to miniaturize transformer 1, an increase in the loss due to a higher frequency can be restrained by using an amorphous material as the iron core material.

Although silicon is generally used for semiconductor switching elements Q11 to Q24 used in Embodiment 5, a semiconductor switching element may be used that includes silicon carbide or gallium nitride, which is a wide bandgap semiconductor having a bandgap wider than that of silicon, diamond, or the like. This enables use at a higher voltage and switching at higher speed, leading to miniaturization of transformer 1.

Power converter 2 of the present embodiment includes transformer 1 of any one of Embodiments 1 to 4, and accordingly, high-voltage, high-capacity power converter 2 can be achieved.

According to power converter 2 of the present embodiment, a DC/DC converter can be formed.

Power converter 2 of the present embodiment enables zero-voltage switching, thus reducing a switching loss.

According to power converter 2 of the present embodiment, even when semiconductor switching elements Q11 to Q24 are switched at a frequency not less than 100 Hz, a material with a low hysteresis loss, which has an upper limit for the size of the iron core due to manufacturing constrains, such as an amorphous material, can be used for iron cores, restraining an increase in the loss due to a higher frequency.

Embodiment 7

Figure 20:
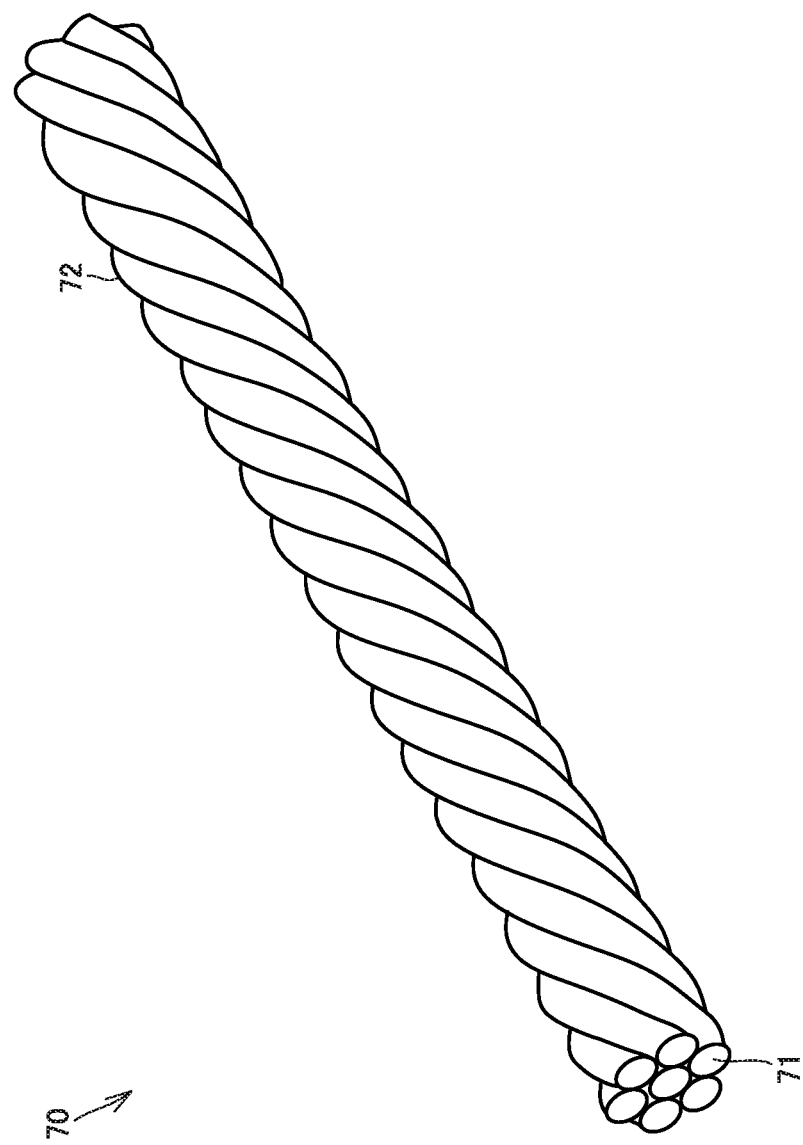
FIG. 20 is a schematic sectional view of an example conductive wire according to Embodiment 7 of the present invention.

FIG. 20 shows an example conductive wire 70 according to Embodiment 7 of the present invention. Conductive wire 70 shown in FIG. 5 is formed of narrow and small conductor strands 71, and can reduce an eddy-current loss of a winding which is generated by interlinkage of the leakage flux of transformer 1 with the winding. In power converter 2, however, currents supplied to low-voltage winding 40 and high-voltage winding 50 have a frequency higher than 61 Hz. In conductor strand 71, thus, the skin effect is generated, thus allowing the current to pass only near the surface of conductor strand 71. This results in an action in which the resistance of conductor strand 71 would have increased, leading to an increased loss of transformer 1.

Conductive wire 70 shown in FIG. 20 is a litz wire including intertwined conductor strands 71 each having a strand insulation 72, and can restrain the skin effect and the proximity effect at high frequencies, thus restraining an increase in the loss due to higher frequencies.

Conductive wire 70 configured as descried above enables higher frequency while restraining an increase in the loss of transformer 1, leading to miniaturization of transformer 1.

Embodiments of the present invention can be combined freely or can be modified or omitted as appropriate within the scope of the present invention.

It should be understood that the embodiments disclosed herein are illustrative and non-restrictive in every respect. The scope of the present invention is defined by the terms of the claims, rather than the description of the embodiments above, and is intended to include any modifications within the scope and meaning equivalent to the terms of the claims.

REFERENCE SIGNS LIST

1 transformer, 2 power converter, 3 first terminal, 4 second terminal, 10, 11 iron core stack, 20 first iron core group, 21 second iron core group, 30 winding portion, 40 low-voltage winding, 41 low-voltage AC terminal, 42, 52 conductor, 50 high-voltage winding, 51 high-voltage AC terminal, 60 magnetic circuit, 70 conductive wire, 71 conductor strand, 72 strand insulation, 73 common insulation, 80 tank, 100 annular iron core, 100*b*, 112, 122 insulating layer, 101 insulator, 110 annular iron core (cut core), 111 cut portion, 113 binding member, 114 fixing member, 120 annular iron core (lap joint core), 121 lap portion, 200 DC/AC converter, 201 low-voltage DC terminal, 300 AC/DC converter, 301 high-voltage DC terminal, 400 DC/DC converter cell, 401 drive circuit, 402 gate signal, Q11, Q12, Q13, Q14, Q21, Q22, Q23, Q24 semiconductor switching element, Cdc1, Cdc2 DC capacitor, CS snubber capacitor, LS inductance.

The invention claimed is:

1. A transformer comprising:
a first iron core group including a plurality of iron core stacks adjacent to each other;
a second iron core group disposed to face the first iron core group while being spaced therefrom, the second iron core group including a plurality of iron core stacks each disposed to face a corresponding one of the plurality of iron core stacks of the first iron core group; and
a plurality of winding portions each wound across a corresponding one of the plurality of iron core stacks of the first iron core group and a corresponding one of the plurality of iron core stacks of the second iron core group, the corresponding one of the plurality of iron core stacks of the second iron core group facing the corresponding one of the plurality of iron core stacks of the first iron core group, wherein
the plurality of iron core stacks of the first iron core group and the plurality of iron core stacks of the second iron core group each include a plurality of annular iron cores stacked on each other,
the plurality of iron core stacks of the first iron core group are disposed side by side in a first direction, and the plurality of iron core stacks of the second iron core group are disposed side by side in the first direction in parallel with the first iron core group,
the plurality of iron core stacks of the first iron core group and the plurality of iron core stacks of the second iron core group each have an iron core window passing through in a second direction intersecting the first direction,
each of the plurality of winding portions is wound, through the iron core window of a corresponding of the plurality of iron core stacks, across a corresponding one of the plurality of iron core stacks of the first iron core group and a corresponding one of the plurality of iron core stacks of the second iron core group, the corresponding one of the plurality of iron core stacks of the first iron core group and the corresponding one of the plurality of iron core stacks of the second iron core group facing each other in a third direction intersecting the first direction and the second direction,
each of the plurality of winding portions includes a first winding and a second winding,
a plurality of the first windings are connected one-to-one to a plurality of first AC terminals,
a plurality of the second windings are connected one-to-one to a plurality of second AC terminals,
the plurality of first AC terminals are connected one-to-one to a plurality of DC/AC converters, and
the plurality of second AC terminals are connected one-to-one to a plurality of AC/DC converters.

2. The transformer according to claim 1, wherein
each of the plurality of winding portions includes a pair of low-voltage windings M the first winding and a high-voltage winding as the second winding sandwiched between the pair of low-voltage windings, and
the high-voltage winding is spaced from each of the pair of low-voltage windings,
an insulation distance is maintained between each of the pair of low-voltage windings and a corresponding one of the iron core stacks, the insulation distance corresponding to a difference between a potential generated in each of the pair of low-voltage windings and a potential present in the corresponding one of the iron core stacks,
an insulation distance is maintained between the high-voltage winding and each of the iron core stacks, the insulation distance corresponding to a difference between a potential generated in the high-voltage winding and each of the iron core stacks, and
an appropriate insulation distance is maintained between each of the pair of low-voltage windings and the high-voltage winding, the appropriate insulation distance corresponding to a difference between a potential generated in each of the pair of low-voltage windings and a potential generated in the high-voltage winding.

3. The transformer according to claim 1, wherein
each of the plurality of annular iron cores includes a core material, and
the core material includes an amorphous material.

4. The transformer according to claim 3, wherein
each of the plurality of annular iron cores includes an insulating layer covering at least part of the core material, and
the insulating layer includes at least any one of an oxide and a resin.

5. The transformer according to claim 1, further comprising:
a tank to accommodate the first iron core group, the second iron core group, and the plurality of winding portions; and
insulating oil filling the tank,
wherein the first iron core group, the second iron core group, and the plurality of winding portions are immersed in the insulating oil within the tank.

6. The transformer according to claim 1, further comprising an insulator including a non-magnetic material,
wherein the insulator is sandwiched between the plurality of iron core stacks of each of the first iron core group and the second iron core group and is sandwiched between the plurality of annular iron cores.

7. The transformer according to claim 1, wherein
each of the plurality of annular iron cores includes a pair of semi-annular portions, and
each of the plurality of annular iron cores is formed into an annular shape by connecting the pair of semi-annular portions to each other.

8. The transformer according to claim 7, further comprising a first binding member including a non-magnetic material,
wherein the first binding member fixedly fastens each of the pair of semi-annular portions.

9. The transformer according to claim 8, wherein the first binding member includes non-magnetic metal, resin, plastic, and glass fiber.

10. The transformer according to claim 7, further comprising a fixing member including a non-magnetic material,
wherein the fixing member fixes the pair of semi-annular portions by connecting the pair of semi-annular portions into an annular shape.

11. The transformer according to claim 1, wherein
each of the plurality of annular iron cores includes a plurality of ribbon-shaped bodies,
the plurality of ribbon-shaped bodies include a non-magnetic material and are stacked on each other, and
first ends and second ends of the plurality of ribbon-shaped bodies are joined to each other to form a lap portion.

12. The transformer according to claim 11, further comprising a second binding member including a non-magnetic material,
wherein the second binding member fixedly fastens the lap portion.

13. The transformer according to claim 12, wherein the second binding member includes non-magnetic metal, resin, plastic, and glass fiber.

14. The transformer according to claim 11, wherein the plurality of annular iron cores are alternately stacked on each other such that a plurality of the lap portions are displaced from each other by 180 degrees.

15. The transformer according to claim 1, wherein each of the plurality of winding portions includes a litz wire including a plurality of intertwined conductor strands, each of the conductor strands including a strand insulation.

16. A power converter comprising:
a transformer according to claim 1;
a first terminal to output a DC voltage;
a second terminal to output a DC voltage;
a plurality of DC/AC converters; and
a plurality of AC/DC converters, wherein
the plurality of DC/AC converters each have a DC terminal, a plurality of the DC terminals of the plurality of DC/AC converters being connected in parallel and connected in parallel with the first terminal,
the plurality of AC/DC converters each have a DC terminal, a plurality of the DC terminals of the plurality of AC/DC converters being connected in series and connected in parallel with the second terminal,
the DC/AC converters each have an AC terminal, a plurality of the AC terminals of the DC/AC converters being connected to a low-voltage AC terminal of the transformer, and
the AC/DC converters each have an AC terminal, a plurality of the AC terminals of the AC/DC converters being connected to a high-voltage AC terminal of the transformer.

17. The power converter according to claim 16, wherein one of the DC/AC converters, one of the AC/DC converters, semiconductor switching elements of one of the DC/AC converters and one of the AC/DC converters, a drive circuit to control the semiconductor switching elements, and a magnetic circuit of the transformer form a DC/DC converter.

18. The power converter according to claim 17, wherein each of the DC/AC converters and the AC/DC converters includes
a bridge circuit formed of a DC capacitor connected in parallel with the DC terminal, and
two switching legs including the semiconductor switching elements connected in series, and
each of the semiconductor switching elements is connected in parallel with a snubber capacitor.

19. The power converter according to claim 17, wherein the semiconductor switching elements in the DC/AC converters and the AC/DC converters are configured to perform switching at a frequency of 61 Hz or higher.

20. A transformer comprising:
a first iron core group including a plurality of iron core stacks adjacent to each other;
a second iron core group disposed to face the first iron core group while being spaced therefrom, the second iron core group including a plurality of iron core stacks each disposed to face a corresponding one of the plurality of iron core stacks of the first iron core group; and
a plurality of winding portions each wound across a corresponding one of the plurality of iron core stacks of the first iron core group and a corresponding one of the plurality of iron core stacks of the second iron core group, the corresponding one of the plurality of iron core stacks of the second iron core group facing the corresponding one of the plurality of iron core stacks of the first iron core group, wherein
the plurality of iron core stacks of the first iron core group and the plurality of iron core stacks of the second iron core group each include a plurality of annular iron cores stacked on each other, the plurality of iron core stacks of the first iron core group are disposed side by side in a first direction, and the plurality of iron core stacks of the second iron core group are disposed side by side in the first direction in parallel with the first iron core group, the plurality of iron core stacks of the first iron core group and the plurality of iron core stacks of the second iron core group each have an iron core window passing through in a second direction intersecting the first direction, each of the plurality of winding portions is wound, through the iron core window of a corresponding of the plurality of iron core stacks, across a corresponding one of the plurality of iron core stacks of the first iron core group and a corresponding one of the plurality of iron core stacks of the second iron core group, the corresponding one of the plurality of iron core stacks of the first iron core group and the corresponding one of the plurality of iron core stacks of the second iron core group facing each other in a third direction intersecting the first direction and the second direction, the plurality of iron core stacks are provided in the first direction to be in direct contact with each other or in indirect contact with each other via an insulation including a non-magnetic material.

* * * * *